United States Patent [19]

Kozuki

[11] 4,081,202
[45] Mar. 28, 1978

[54] NOISE REDUCTION DEVICE FOR A CHAIN DRIVE MECHANISM

[75] Inventor: Naoto Kozuki, Sagamihara, Japan

[73] Assignee: Caterpillar Mitsubishi Ltd., Tokyo, Japan

[21] Appl. No.: 742,975

[22] Filed: Nov. 18, 1976

[30] Foreign Application Priority Data

Jan. 26, 1976 Japan .............................. 51-007252

[51] Int. Cl.² ............................................. B62D 55/12
[52] U.S. Cl. ................................... 305/57; 74/243 R
[58] Field of Search ............... 305/57, 56, 21; 74/443, 74/243 C, 243 R, 243 DR

[56] References Cited

U.S. PATENT DOCUMENTS

| | | | |
|---|---|---|---|
| 2,003,528 | 6/1935 | Best | 74/243 R X |
| 4,022,072 | 5/1977 | Chagawa et al. | 305/57 X |
| 4,034,618 | 7/1977 | Groff et al. | 305/57 |

Primary Examiner—Robert B. Reeves
Assistant Examiner—John P. Shannon
Attorney, Agent, or Firm—Charles E. Lanchantin, Jr

[57] ABSTRACT

An improved noise reduction device for a chain drive mechanism is disclosed having a rotatable sprocket with a plurality of peripheral teeth thereon, a chain having a plurality of pivotally coupled links arranged in opposite pairs and a plurality of teeth engaging members trained around the sprocket wherein the device includes a plurality of curved plate springs mounted on the opposite sides of the sprocket for resiliently making sequential radial outward engagement with the chain and for reducing the contact noise between the teeth engaging members and the sprocket teeth. Such device is particularly adaptable to the chain drive mechanism of a track-type tractor.

8 Claims, 2 Drawing Figures

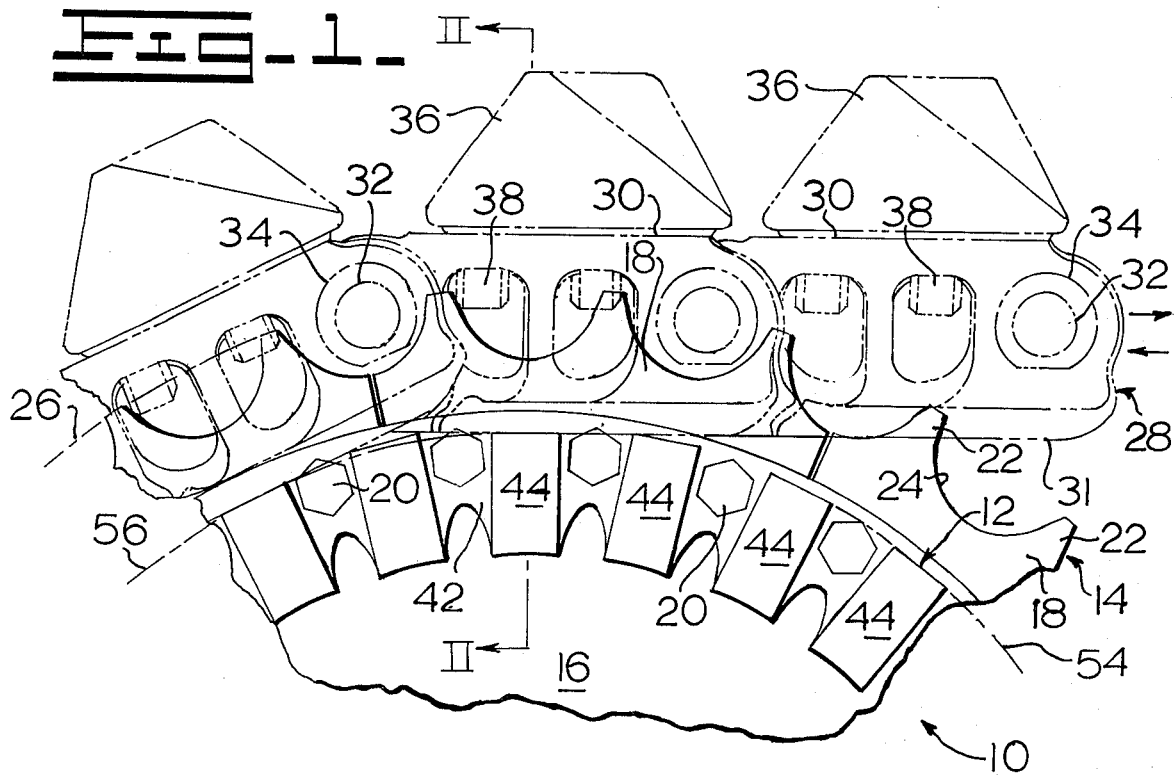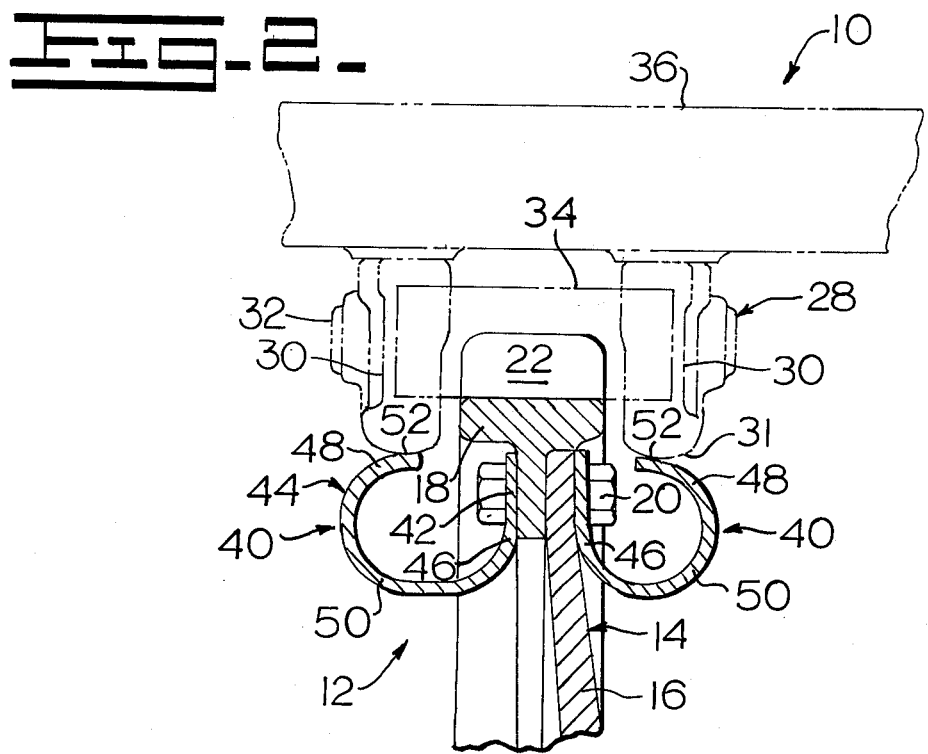

NOISE REDUCTION DEVICE FOR A CHAIN DRIVE MECHANISM

BACKGROUND OF THE INVENTION

This invention relates to a noise reduction device for a chain drive mechanism, and more particularly to a device for reducing noise arising when a track chain of a track-type tractor comes into engagement with a sprocket.

When track-type tractors are operated, particularly in a reverse direction, a noise problem is experienced as a result of the track bushings of the track chains forcefully engaging the sprocket teeth. In order to avoid this shortcoming, it has been proposed to secure rubber members to the opposite sides of the sprocket so as to support the radially inward surfaces of the track links. However, these rubber members are repeatedly contacted by the metal track links under severe environmental conditions so that they fail prematurely. For example, contact with mud, ice and other foreign material quickly causes such rubber members to wear and to generally lose their effectiveness. In addition, the arrangement of securing them to either sprocket or the track frame has been excessively complicated, increasing manufacturing costs.

SUMMARY AND OBJECTS OF THE INVENTION

Accordingly, it is an object of the present invention to provide an improved device for effectively reducing noise arising when a chain comes into engagement with a sprocket, and which device will exhibit a relatively long service life under severe environmental conditions.

It is another object of the present invention to provide such an improved noise reduction device which is economical in its construction.

It is another object to provide a noise reduction device of the character described which may be easily secured to a sprocket.

It is another object of the invention to provide such a noise reduction device which is particularly adaptable for use between the track chain and the driving sprocket of a track-type tractor.

Other objects and advantages of the present invention will become more readily apparent upon reference to the accompanying drawings and the following description.

BRIEF DESCRIPTION OF THE DRAWINGS

FIG. 1 is a partial, side elevational view of a sprocket assembly and a track chain in a drive portion of a track-type tractor which is equipped with a noise reduction device constructed in accordance with the present invention;

FIG. 2 is a fragementary diagrammatic and cross sectional view of the noise reduction device of the present invention as taken along the line II—II of FIG. 1.

DESCRIPTION OF THE PREFERRED EMBODIMENT

Referring to the drawings, there is shown a fragmentary portion of a chain drive mechanism 10 of a track-type tractor or the like which incorporates a noise reduction device 12 which is constructed and arranged in accordance with the present invention. In the usual manner the drive mechanism includes a sprocket assembly or sprocket 14 having a rotatable central hub 16 with a plurality of sprocket segments 18 removably secured thereto about its periphery as by a plurality of fasteners or bolt and nut assemblies 20. Each sprocket segment has a plurality of driving teeth 22 formed thereon and a corresponding plurality of tooth root wear surfaces 24 therebetween. Collectively, the outer ends of the teeth define a tooth addendum circle 26 having a predetermined diameter.

The drive mechanism 10 further includes a conventional endless track chain 28, shown in phantom for illustrative convenience, which is trained around the sprocket assembly 14 and in engagement with the sprocket teeth 22. This permits the chain to be driven in either a forward or reverse direction, as indicated by the arrows in FIG 1, due to the rotation of the sprocket assembly. The chain includes a plurality of adjoining track links 30 individually having a radially innermost rail surface 31 which are arranged in laterally facing pairs and pivotally coupled to each other through a plurality of track pins 32 and track bushings 34 in the usual manner. Moreover, a plurality of track shoes 36 are secured to the track links by a plurality of bolts 38. Thus, the track chain bushings 34 make engagement with the sprocket teeth 22 and the wear surfaces 24, with it being understood that the remainder of the chain is engaged with one or more idler wheels, not shown.

In accordance with the present invention, the illustrated noise reduction device 12 includes a curved plate spring apparatus 40 removably mounted on each side of the sprocket assembly 14 as by the fasteners 20. Each apparatus includes a common annular base portion 42 with a plurality of rounded plate springs 44 projecting therefrom at equally spaced apart distances about the circumference of the sprocket assembly 14 and radially inwardly of the sprocket teeth 22. As shown best in FIG. 2, the plate springs are mounted in pairs on the opposite sides of the sprocket assembly and individually include a fixed inner end 46 secured to either the hub 16 or sprocket segment 18, and a resiliently projecting free outer end 48 interconnected by a curved or rounded central portion 50. In this manner each of the plate springs has a substantially circular cross section, with a radially outermost surface 52 on each one defining a circle 54 as shown in FIG. 1 having a diameter which is slightly larger than a circle 56 defined by the rail surfaces 31 of the track links 30, but smaller than the tooth addendum circle 26.

Thus, in operation, the radially outermost surfaces 52 of the plate springs 44 are sequentially radially inwardly deformed by the radially innermost surfaces 31 of the track links 30 when the track chain 28 travels tangentially into contact with the rotating sprocket assembly 14. Thus, the plate springs bias the links radially outwardly upon forward or rearward running of the tractor, with each of the opposite track links first contacting the plate springs, and then allowing the trailing track bushing 34 to engage the sprocket teeth 22 and the wear surface 24. In other words, the track bushings engage the sprocket assembly with less impact force because the curved plate springs are elastically deflected by the track chain, and thereby the noise generated by the bushing contact is reduced. Furthermore, when the track chain is disengaged from the sprocket assembly, it is sequentially pushed away therefrom by the reaction of the plate springs. Since the plate springs are preferably made of metal they will experience a minimum of wear and deterioration, even under adverse environmental conditions.

While the preferred embodiment noise reduction device 12 described above includes a common annular base portion 42, it may also be of a segment type. In such case, the annular base portion would be divided into a plurality of segments in a manner corresponding to the sprocket segments 18. In addition, the plate springs 44 may consist of substantially rounded pieces of metal plates without base portions which are secured to the sprocket assembly. Moreover, while the plate springs preferably make contact with the surfaces 31 of the track links 30, it is to be appreciated that they may engage other portions of the track links or track shoes without departing from the spirit of the present invention.

Various other modifications of the noise reduction device 12 may be inferred by those skilled in the art. For example, while the plate springs 44 are somewhat C-shaped in section, other shapes may be utilized. Alternately, though not shown in the drawings, there may be provided an annular flange on each side of the sprocket assembly in concentric relationship thereto, with a plurality of plate springs secured or anchored to the peripheral surface of each of the flanges in an equally spaced apart relation, like an impeller.

In view of the foregoing, it is readily apparent that the device of the present invention will reduce noise arising from engagement of a drive chain with a sprocket, and which device is economical in construction, easy to install on the sprocket by utilizing conventional fasteners already thereon, and capable of a long service life.

It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow.

What is claimed is:

1. An improved noise reduction device for a chain drive mechanism having a rotatable sprocket with a plurality of peripheral teeth thereon, a chain having a plurality of pivotally coupled links arranged in opposite pairs and a plurality of teeth engaging members trained around the sprocket, wherein the improvement comprises:

means mounted on the sprocket for resiliently making sequential radial outward engagement with the chain and for reducing the contact noise between the teeth engaging members and the sprocket teeth, said means including a deflectable plate spring having a curved portion in cross section.

2. The noise reduction device of claim 1 wherein the means includes a common annular base portion with a plurality of the deflectable plate springs secured thereto on each side of the sprocket.

3. The noise reduction device of claim 2 wherein the plate springs cooperatively engage the chain in pairs on the opposite sides of the sprocket and are somewhat C-shaped in section.

4. The noise reduction device of claim 3 wherein each of the links has a radially innermost rail surface and each of the plate springs has a deflectable radially outermost surface for contacting the respective rail surface.

5. The noise reduction device of claim 1 wherein the means includes a plurality of cooperating pairs of the deflectable plate springs, each plate spring having in serially connected order a fixed inner end, the curved portion, and a resiliently deflectable free outer end for engaging the chain.

6. The noise reduction device of claim 5 wherein the plate springs have a substantially circular cross section.

7. A noise reduction device for a track-type tractor drive mechanism including a sprocket with a plurality of peripheral teeth thereon and a track chain having a plurality of adjoining links arranged in opposite pairs, and which links are pivotally coupled together by a plurality of track pins and a cooperating plurality of bushings, wherein the device comprises a plurality of deflectable curved metal spring elements mounted on the opposite sides of the sprocket for resiliently making radial outward engagement sequentially with the pairs of the links and for reducing contact noise between the bushings and the sprocket teeth.

8. A noise reduction device, for use in a track-type tractor including a sprocket having a plurality of teeth thereon and a track chain trained around the sprocket, characterized by a plurality of paired plate springs which are outwardly rounded substantially into a circular cross section and made of a metal, with one end of each plate spring secured to the sprocket and the other end thereof being free, with the plate springs resiliently radially outwardly engaging the track chain when it comes into engagement with the sprocket, and with the plate springs being positioned at an equal spacing about the circumference of the sprocket and radially inwardly of the sprocket teeth.

* * * * *